(12) United States Patent
Xu et al.

(10) Patent No.: US 8,675,956 B2
(45) Date of Patent: Mar. 18, 2014

(54) METHOD AND SYSTEM FOR VERIFYING MAKING TIME OF A FILE BY COMPUTER

(75) Inventors: Daihua Xu, Shenzhen (CN); Haishan Zhang, Shenzhen (CN); Yanjun Guan, Shenzhen (CN)

(73) Assignee: Guangdong Nantian Judicial Appraisal Firm (CN)

( * ) Notice: Subject to any disclaimer, the term of this patent is extended or adjusted under 35 U.S.C. 154(b) by 694 days.

(21) Appl. No.: 12/867,763

(22) PCT Filed: Feb. 5, 2010

(86) PCT No.: PCT/CN2010/070547
§ 371 (c)(1),
(2), (4) Date: Aug. 16, 2010

(87) PCT Pub. No.: WO2010/121504
PCT Pub. Date: Oct. 28, 2010

(65) Prior Publication Data
US 2011/0058236 A1 Mar. 10, 2011

(30) Foreign Application Priority Data
Apr. 24, 2009 (CN) .......................... 2009 1 0106896

(51) Int. Cl.
*G06K 9/00* (2006.01)

(52) U.S. Cl.
USPC .......................................... 382/162; 382/165

(58) Field of Classification Search
USPC .......................................... 382/100, 162, 165
See application file for complete search history.

(56) References Cited

U.S. PATENT DOCUMENTS

| | | | | |
|---|---|---|---|---|
| 5,845,001 A | * | 12/1998 | Thomas | 382/100 |
| 2005/0057797 A1 | * | 3/2005 | Treado et al. | 359/368 |

OTHER PUBLICATIONS

Pelagotti et al., Multispectral Imaging of Paintings, IEEE signal processing magazine, Jul. 2008, pp. 27-36.*
Colantoni et al., Analysis of multispectal images of paintings, 14$^{th}$ European signal processing conference, Sep. 2006.*

* cited by examiner

*Primary Examiner* — John Strege
(74) *Attorney, Agent, or Firm* — Ostrolenk Faber LLP

(57) ABSTRACT

The present invention is providing a method and a system for verifying making time of a file by computer. The method comprises: calling TWAIN protocol interfaces of a scanner for obtaining original color data both of an object file and a sample file, wherein making time of said sample file is known; sampling color points of said original color data of said object file thereby calculating color index data of said object file; and sampling color points of said original color data of said sample file thereby calculating color index data of said sample file; and comparing said color index data of said object file with said color index data of said sample file, and determining making time of said object file based on said known making time of said sample file. In accordance with the present invention, the sample file or the object file can be verified without damaged for the reason of analyzing color of said file by computer. By use of the computer system for sampling, analyzing, carrying out the result the present invention has reduced the influence of man-made factor so that it provides more reliable security to such result.

6 Claims, 6 Drawing Sheets

METHOD AND SYSTEM FOR VERIFYING MAKING TIME OF A FILE BY COMPUTER

CROSS-REFERENCE TO RELATED APPLICATIONS

The present application is a 35 U.S.C. §§371 national phase conversion of PCT/CN2010/070547, filed Feb. 5, 2010, which claims priority of Chinese Patent Application Number 200910106896.0, entitled METHOD AND SYSTEM FOR VERIFYING MAKING TIME OF A FILE BY COMPUTER, and filed in the name of GUANGDONG NANTIAN JUDICIAL APPRAISAL FIRM on Apr. 24, 2009, the contents of which are incorporated herein by reference. The PCT International Application was published in the Chinese language.

BACKGROUND OF THE PRESENT INVENTION

1. Field of the Present Invention

The present invention relates to file verifying technology, and more especially to a method and a system for verifying making time of a file by computer.

2. Description of the Prior Art

Verifying making time of a file is an important part of criminal judicial appraisal, and is also a problem in the file verifying field. The technology of verifying making time of a file began in 1904. In the early stage such research focused on the writing by the fountain pen, and then expanded to the writing by the ball-point pen which occurred in 1937. Once upon a century, the scientists around the world put much efforts into verifying making time of a file, however, it is difficult to grasp the variation characteristics with time of the writing since the ink ingredients are complex, and the ink is prone to be influenced by the storage environment (e.g. temperature, humidity, light, oxygen, etc) and other interference factor (the category of paper, the power of writing, and the writing line is coarse or fine) resulting in the physical or chemical vitiation, such as oxidized, decomposed, cross linked, or volatilized. Verifying making time of a file is a big obsession for global scientists all the time.

Generally verifying making time of the file is such a way of analyzing variation with time of the ink ingredients with aid of chemical reaction between the chemical reagents and the ink, or an apparatus to determining making time of the file. At present, there are physical and chemical methods. Common methods include impressing, solvent extraction, sulfate diffusion measurement, TLC (Thin Layer Chromatography), HPLC (High Performance Liquid Chromatography), CE (Capillary Electrophoresis), GC-MS. (Gas chromatography-mass spectrometry), Fourier-infrared spectrometry, Raman spectrometry, microscopic spectrophotometry, FDMS (field desorption mass spectrometry), X-ray electronic energy spectrum, artificial ageing etc. Based on different principles, the aforesaid methods each of which has advantages and shortcomings can be combined in the case of without destroying the file.

The methods for verifying making time of the file often used in China include impressing, extraction solvent, measure of the diffusion of vitriol, TLC. The impressing method is a physical method, and the others are chemical methods by which analyze the making time of the file from the chemical reaction of ink ingredients. The impressing method analyzes the making time of the file by judging whether the writing on the file is transferable after impressed. Unfortunately, through this method, the making time of the file has a vague range, which significantly reduces the verifying accuracy. Those chemical methods often have to break the object file before verifying. In addition, due to the complex ink ingredients, the complexity of the chemical methods is greatly increased, and there are many uncontrollable factors, which brings certain limitation to the verifying condition and analysis result, and generates error to such result.

In conclusion, the physical method and the chemical methods for verifying making time of the file at present are very complicated in practice, and it is impossible to verify making time of the file very precisely. Additionally, it has high requirements for the object file and the sample file while the sample file offered by the applicant who requests to verify making time of the object file could not satisfy such specific requirements normally, whereby such verifying could not be achieved.

BRIEF SUMMARY OF THE PRESENT INVENTION

A primary object of the present invention is to provide a method and a system for verifying making time of a file by computer, so as to solve the problem that making time of a file could not be verified accurately by a conventional physical or chemical method.

To achieve the above-mentioned object, a method for verifying making time of a file by computer of the present invention is disclosed as follows:

calling TWAIN protocol interfaces of a scanner for obtaining original color data both of an object file and a sample file, wherein making time of said sample file is known;

sampling color points of said original color data of said object file thereby calculating color index data of said object file; and sampling color points of said original color data of said sample file thereby calculating color index data of said sample file; and comparing said color index data of said object file with said color index data of said sample file, and determining making time of said object file based on said known making time of said sample file.

Another method for verifying making time of a file by computer in accordance with the present invention comprises:

calling TWAIN protocol interfaces of the scanner for obtaining original color data of an object file and a sample file;

sampling color points of said original color data of said object file, and respectively calculating color index data of said object file at a plurality of timing points;

obtaining variation characteristics with time of said color index data of said object file according to the relationship between the color index data calculated at said timing points and said timing points, and determining making time of said object file according to said variation characteristics with time of color index data of said object file.

Correspondingly, the present invention is to provide a computer system for verifying making time of a file in which the described method is applicable. That computer system comprises:

a scanner for obtaining original color data of a object file and a sample file by calling TWAIN protocol interfaces thereof, wherein making time of said sample file is known;

a data sampling device for sampling color points of said original color data of said object file thereby calculating color index data of said object file; and sampling color points of said original color data of said sample file thereby calculating color index data of said sample file; and a data analyzing device for comparing said color index data of said object file with said color index data of said sample file, and determining making time of said object file based on said known making time of said sample file.

Correspondingly, another computer system for verifying making time of a file in accordance with the present invention, comprises:

a scanner for calling TWAIN protocol interfaces of the scanner for obtaining original color data of an object file and a sample file;

a data sampling device for sampling color points of said original color data of said object file, and respectively calculating color index data of said object file at a plurality of timing points;

an obtaining device for obtaining variation characteristics with time of said color index data of said object file according to the relationship between the color index data calculated at said timing points and said timing points; and a determining device for determining making time of said object file according to said variation characteristics with time of color index data of said object file.

In accordance with the present invention, the sample file or the object file can be verified without damaged for the reason of analyzing color of said file by computer. By use of the computer system for sampling, analyzing, carrying out the result the present invention has reduced the influence of man-made factor so that it provides more reliable security to such result. In addition, the high accuracy sampling device of the present invention and system software equipped and programmed therein could ensure objectivity to the sampling data and security to data analysis. Moreover, the operation of the present invention is simple and easy.

DETAILED DESCRIPTION OF THE PRESENT INVENTION

The present invention can obtain the original color data of the object file or the sample file, and then count and analyze after sampling the color points on the original color data, finally determine the making time of the object file.

Figure 1:
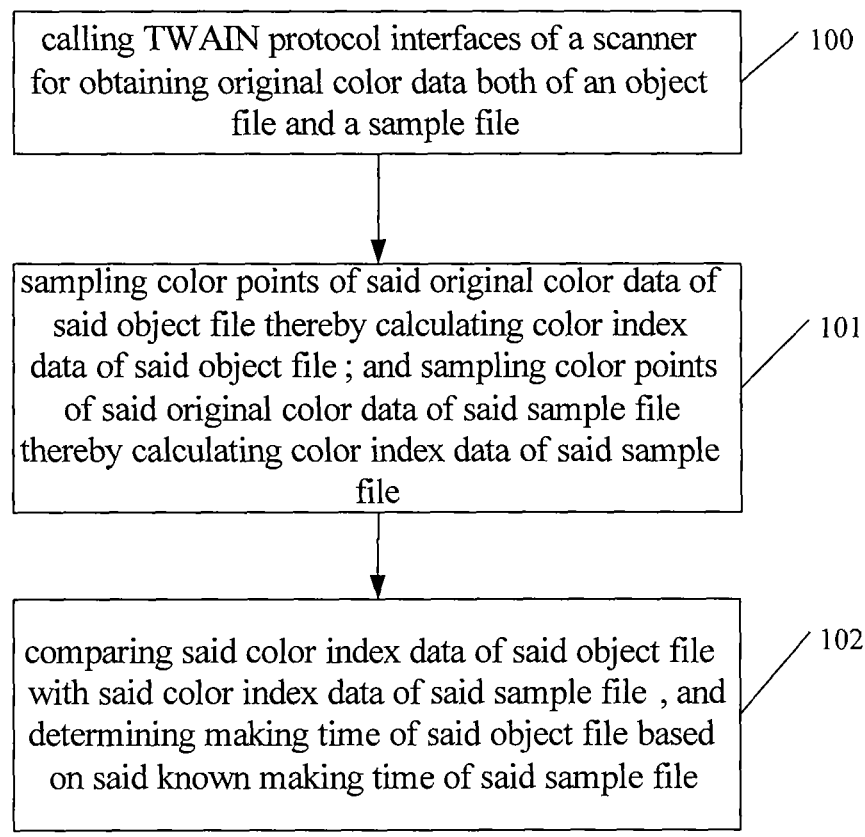
FIG. 1 is a flow chart illustrating an embodiment of a method for verifying making time of a file by computer in accordance with the present invention.

FIG. 1 shows a flow chart illustrating a method for verifying making time of a file by computer in accordance with the present invention.

At present, the data obtained by conventional methods have poor precision and the precision is very much influenced by the object file or the sample file. The present invention can analyze the color data of the object file by computer, so how to get the original color data of the file by a common scanner is the first problem to be solved. During experiments and research of the present invention the inventors find out running a computer software in a common scanner has given a way to obtain the original color data and further high accuracy result, so as to provide a good prepare for sampling.

The detailed embodiment of the method for verifying making time of a file by computer in accordance with the present invention is disclosed as follows:

At step 100, calling TWAIN protocol interfaces of a scanner for obtaining original color data both of an object file and a sample file, wherein making time of said sample file is known;

This step further includes scanning the object file and the sample file, and saving the original color data of the object file and the sample file after scanned into the computer. The principle of obtaining original color data in accordance with the present invention will be described hereinafter.

The scanner usually has embedded a scanning application or a third-party scanning application most of which do compression or other unknown operation to the data so that originality of the data could not be ensured.

The present invention uses the TWAIN protocol interfaces of the scanner straightly; under a series of control processes it can get the original data of the scanner. In this embodiment, the aforesaid control processes include:

1) Loading the TWAIN_32.DLL into the memory of the computer.
2) Opening the data source manager.
3) Choosing the data source.
4) Setting a parameter to get color data.
5) Displaying the user interface of the scanner to control the file scanning.
6) Getting the data (including 8 BIT/16 BIT/24 BIT/48 BIT).
7) Saving above-mentioned data as data files having special format in accordance with the present invention.
8) Closing the DS.
9) Closing the DSM.
10) Clearing the TWAIN_32.DLL of the memory.

It should be noted that TWAIN is an important interface standard which provides a uniform standard for the software developers and the hardware device manufacturers, so as to avoid incompatibility between the software and the hardware device. The TWAIN interfaces provide software support to the operating system of the computer; so that the software conforming to the TWAIN protocol can get the static images (namely original data including original color data) from the peripheral equipment compatible with the TWAIN protocol by calling TWAIN protocol interfaces.

Be different from the prior art, the present invention analyses the color by computer. The prior art analyses the color of the whole image, while the present invention mainly makes statistics and analysis in respect of the color data.

At step 101, sampling color points of said original color data of said object file thereby calculating color index data of said object file; and sampling color points of said original color data of said sample file thereby calculating color index data of said sample file;

It should be noted that when sampling the color points of the original color data of the object file and the sample file, it could adopt n×n pattern to sample many times in order to reduce the error of the sampling; it would take the color space or color brightness as an index for calculating the color index data of the object file and the sample file.

After calculating, save the calculated color index data as a predetermined data format.

The data format is shown as the table:

| file header | Meaning | number of bytes | specification |
|---|---|---|---|
| 0 | type | 2 | Two available types: TWPT_GRAY: grayscale image TWPT_RGB: color image |
| 1 | Bit | 2 | Supporting 8 bit, 16 bit, 24 bit, 48 bit respectively |
| 2 | width | 4 | Width of the image |
| 3 | height | 4 | Height of the image |
| 4~(n + 3) | Data | n | Data of the image n = height × width × bit/8 |

At the step 102, comparing said color index data of said object file with said color index data of said sample file, and determining making time of said object file based on said known making time of said sample file.

if $$\frac{|C_j - C_y|}{C_j} \le A,$$

determining said object file having the same making time as said sample file; or else determining said object file having a different making time from said sample file; wherein said character $C_j$ is representative of the color index data of said object file, said character $C_y$ is representative of the color index data of said sample file, said character A is representative of the designated index data;

in the situation that making time of said object file is different form that of said sample file, if $C_j - C_y > 0$, then determining said object file having earlier making time than said sample file; if $C_j - C_y < 0$, then determining said object file having later making time than said sample file.

It should be noted that, the sample file of the present invention is provided by the applicant who requests to verify making time of the object file. It requires that the ink used in the sample file must be identical with the object file.

In the embodiment, the sample file is generally relative to the object file. The applicant often provides the object file and then according to the instructions provides relevant sample file of which the making time is known. For instance, if judging whether the making time of an object file is 1 Jan. 2000, the applicant is asked to provide a sample file made around 1 Jan. 2000.

The present invention can judge the making time of the object file relative to the sample file based on the variation characteristics with time both of the object file and the sample file via above-mentioned steps.

In accordance with the present invention, the sample file or the object file can be verified without damaged for the reason of analyzing color of said file by computer. By use of the computer system for sampling, analyzing, carrying out the result the present invention has reduced the influence of man-made factor so that it provides more reliable security to such result. In addition, the high accuracy sampling device of the present invention and system software equipped and programmed therein could ensure objectivity to the sampling data and security to data analysis. Moreover, the operation of the present invention is simple and easy.

Since the error may exist during the sampling process, how to reduce such error is a key point of the present invention.

In the embodiment, how to reduce the error during the scanning process will be explained.

The scanning error during the scanning process includes:

1. Position Error;

When repeated scanning, due to the object file or the sample file need to be putted in or taken out constantly, the position and angle of such file arranged in the scanner is different every time, which brings influences to the scanning result and the position error is generated.

Figure 2:
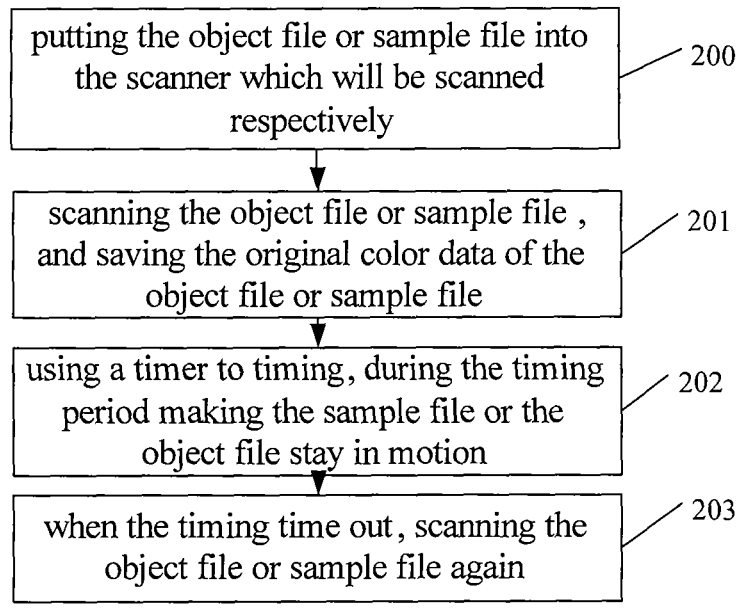
FIG. 2 is a flow chart illustrating an embodiment of a method for reducing the scanning error in accordance with the present invention.
Figure 3:
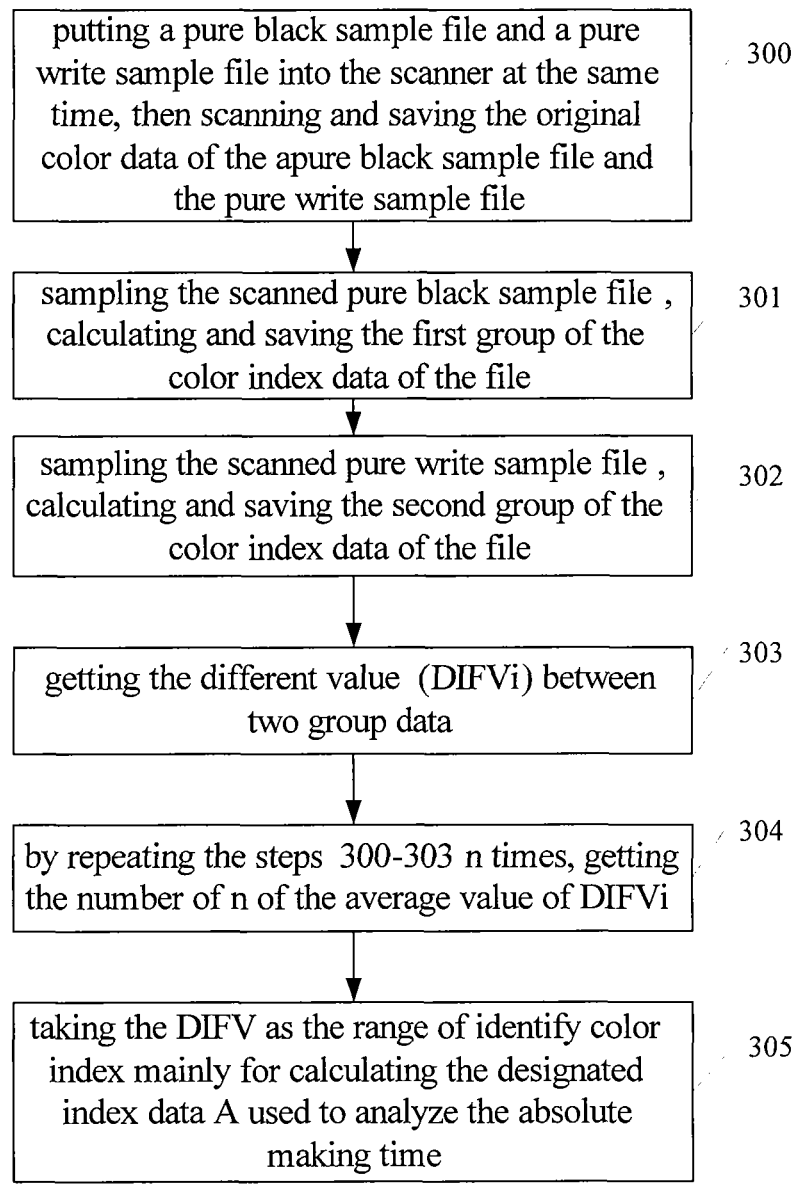
FIG. 3 is a flow chart illustrating anther embodiment of the method for reducing the scanning error in accordance with the present invention.

In this embodiment, the position error could be reduced by scanning the file at different time without being taken out. Referring to FIG. 2, the method for reducing the position error includes:

At step 200, putting the object file or sample file into the scanner which will be scanned respectively;

At step 201, scanning the object file or sample file, and saving the original color data of the object file or sample file;

At step 202, using a timer to timing, during the timing period making the sample file or the object file stay in motion, in other words, during the timing period the sample file or the object file would not be taken out, so that the scanner can keep in the status until time out.

At step 203, when the timing time out, scanning the object file or sample file again.

Repeat the steps 202 and 203 until complete the scanning.

2. Optical Error:

When scanning the same object file or the same sample file repeatedly and when the scanner transforms the color data optically, optical error may occur. The optical error is caused by the work principle of the scanner. The method of getting the optical error index which is used to specify the optical error is described as follows:

a. Range of Identify Color Index

Range of identify color is well-known as the dynamic range of identifying the color by the scanner. Because of the inherent optical and electronic factors of the scanner, there exists certain color deviation of the image after scanned, that is, there is a deviation comparable with real color of the image. Referring to FIG. 2, the range of the optical error can be tested by the method stated as follows:

At step 300, putting a pure black sample file and a pure write sample file into the scanner at the same time, then scanning and saving the original color data of the pure black sample file and the pure write sample file;

At step 301, sampling the scanned pure black sample file, calculating and saving the first group of the color index data of the file;

At step 302, sampling the scanned pure write sample file, calculating and saving the second group of the color index data of the file;

At step 303, getting the different value (DIFVi) between two group data;

At step 304, by repeating the steps 300-303 n times, getting n numbers average value of DIFVi (namely DIFV) (n≥1, generally n=10)

At step 305, taking the DIFV as the range of identify color index mainly for calculating the designated index data A used to analyze the absolute making time. The designated index data A means a data integrated calculated the said error, and it depends on the ink category, and the detailed description will be described hereinafter.

b. Optical Error Index

Figure 4:
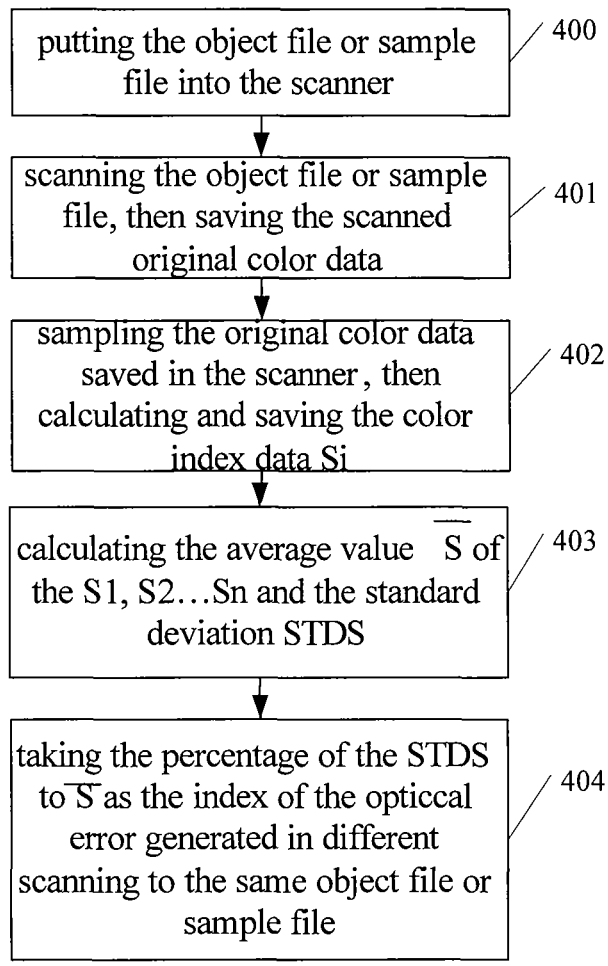
FIG. 4 is a flow chart illustrating an embodiment of a method for reducing optical error in accordance with the present invention.

In order to verify the error generated in scanning the same object file or sample file in different times. Referring to FIG. 4, the optical error index can be got by the method disclosed as follows:

At step 400, putting the object file or sample file into the scanner;

At step 401, scanning the object file or sample file, then saving the scanned original color data. Repeating the step 401 by n times (n≥1, generally n=10).

At step 402, sampling the original color data saved in the scanner, then calculating and saving the color index data Si(1≤i≤n). Repeat the step 402 by n times (n≥1, generally n=10).

At step 403, calculating the average value $\overline{S}$ of the S1, S2 . . . Sn and the standard deviation STDS.

At step 404, taking the percentage of the STDS to $\overline{S}$ as the index of the optical error generated in different scanning to the same object file or sample file;

In the sampling process, differences of the position or the part of the sample file to be sampled would cause certain error to the analysis result. Because the index data are selected at random, there exists certain random error.

The present invention provides a solution as follows: using n×n pattern for sampling the color points (wherein the n is positive integer) so as to reduce the error in the sampling process, viz. when using the n×n matrix pattern for sampling the color points, summing the data of the matrix center and (n×n)−1 numbers of data around the center (there is n×n numbers of data in the matrix), and then the total being averaged to get a final color points data.

a. Averaging the Data in the Same Area, the Operation is as Follows:

Sampling the data of the scanned object file or sample file in the designated area. In this embodiment, using [3×3] pattern or [5×5] pattern to average the data to reduce the error in the sampling process. It is understandable that the [3×3] pattern is one form the [n×n] pattern that the n is equal to 3, and the [5×5] pattern is one form the [n×n] pattern that the n is equal to 5. Of course the n also can be any other positive integer, the detailed description is thus omitted here.

| 5 × 5 pattern | | |
| --- | --- | --- |
| D1 | D2 | D3 |
| D4 | D5 | D6 |
| D7 | D8 | D9 |

Viz. averaging the matrix center D5 and other data around it to get $\overline{D}$, and then get a final color point data.

| 5 × 5 pattern | | | | |
| --- | --- | --- | --- | --- |
| D1 | D2 | D3 | D4 | D5 |
| D6 | D7 | D8 | D9 | D10 |
| D11 | D12 | D13 | D14 | D15 |
| D16 | D17 | D18 | D19 | D20 |
| D21 | D22 | D23 | D24 | D25 |

Viz. averaging the matrix center D13 and other data around it to get $\overline{D}$, and then get a final color point data.

A large amount of experiments suggest that the final color point data obtained by 5×5 pattern are more reliable, and using the average value of the area in place of the single value will make the whole index more representative and reduce the effect from the local data, so the sampling error could be reduced.

b. Sampling Many Times

Because of taking the random data as the analysis data, the random error may occur. The way of sampling the data many times can reduce the error.

Figure 5:
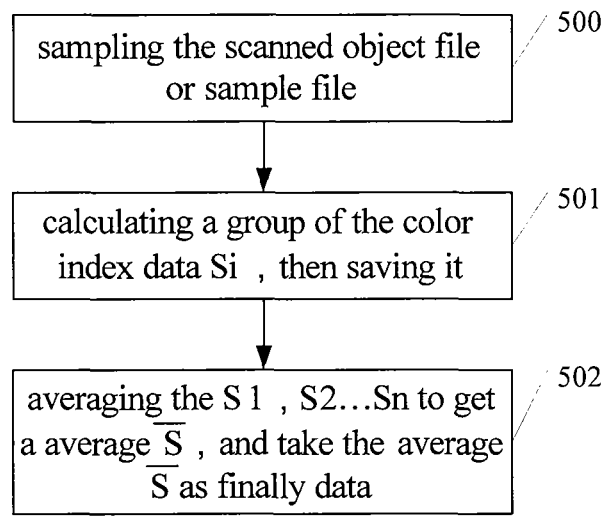
FIG. 5 is a flow chart illustrating an embodiment of a method for reducing sampling error in accordance with the present invention.

Referring to FIG. 5, the operating processes include:

At step 500, sampling the scanned object file or sample file; Repeating the step 500 n times (n≥1).

At step 501, calculating a group of the color index data Si (1≤i≤n), then saving it.

At step 502, averaging the S1, S2 . . . Sn to get a average $\overline{S}$, and take the $\overline{S}$ as final data.

Because sampling many times, $\overline{S}$ is representative.

The present invention provides a computer system making statistics and analysis concerning to the color data. The present invention takes the RGB color space method as main analysis method, and other analysis methods as secondary methods (R is red, G is green, B is blue). The operation and principle of the RGB analysis method and the brightness analysis method will be described hereinafter.

Figure 6:
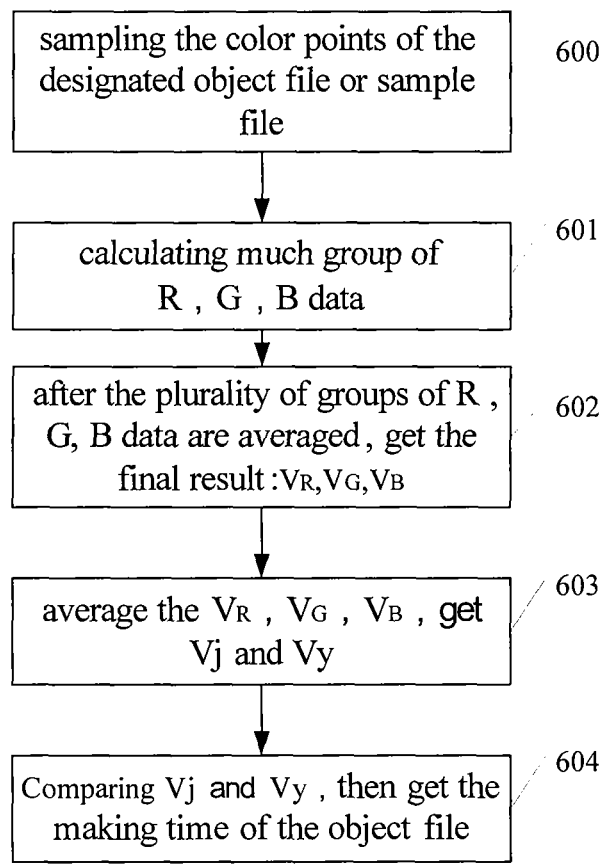
FIG. 6 is a flow chart illustrating anther embodiment of the method for reducing sampling error in accordance with the present invention.

RGB color-space is a model expressing the color. One kind of color is a mixture of R, G, B components. The present invention using the RGB color analysis method for sampling the scanned original color data, then the sampling data will be put in as R, G, B. Referring to FIG. 6, the operation steps include:

At step 600, sampling the color points of the designated object file or sample file.

At step 601, calculating a plurality of groups of R, G, B data.

Specifically, 1) reading the user-defined 48 BIT data file.

2) Choosing and loading the data in the sampling area into the computer memory.

3) Generating 24 BIT RGB data from 48 BIT RGB data.

4) Displaying the 24 BIT RGB data on the computer screen.

5) Choosing the sampling pattern (e.g. 3×3 pattern, 5×5 pattern)

6) Choosing the scaling.

7) moving the mouse or the computer cursor key, choosing the position of color on the screen, clicking the left key of the mouse or the space key, for getting the color value of the position (different sampling pattern bringing different color range). Since the computer screen only display 24 bit data, the data could not be picked directly, it is required to search the corresponding physical position in the memory according to the physical position and current scaling of the 48 bit data, and then taking out the 24 bit data for getting the 48 bit RGB data.

At step 602, after the plurality of groups of R, G, B data are averaged, get the final result: $V_R, V_G, V_B$;

At step 603, average the $V_R, V_G, V_B$, to get $V_j$ and $V_y$, wherein $V_j$ is the color index data of the object file, and $V_y$ is the color index data of the sample file;

At step 604, comparing $V_j$ and $V_y$, then get the making time of the object file, specific by the following equation that:

If $$\frac{|V_j - V_y|}{V_j} \times 100 > A,$$

then deciding the making time of the object file is different from the making time of the sample file, if $V_j - V_y > 0$, then deciding the making time of the object file is earlier than the making time of the sample file; if $V_j - V_y < 0$, then deciding the making time of the object file is later than the making time of the sample file;

If $$\frac{|V_j - V_y|}{V_j} \times 100 \leq A,$$

then deciding the making time of the object file is same as the making time of the sample file;

For example, there are many samples: the sample file "a" was made on 2008 Jan. 1; and the sample "b" was made on 2008 May 1. If judge the object file which was made on Mar. 2, 2008 on Apr. 20, 2009, it must calculate $V_j, V_a, V_b$ on Apr. 20, 2009; and then compare $V_j$ and $V_a$, $V_j$ and $V_b$ respectively. If $V_a < V_j < V_j$, then determine the object file was made between Jan. 1, 2008 and May 1, 2008.

Namely

When $$\frac{|V_j - V_a|}{V_j} \times 100 > A,$$

If $V_j - V_a < 0$, the making time of the object file is later than $V_a$, that is to say later than Jan. 1, 2008.

When $$\frac{|V_j - V_b|}{V_j} \times 100 > A,$$

If $V_j - V_b > 0$, the making time of the object file is earlier than $V_b$, that is to say the object file was made earlier than May 1, 2008.

So it can judge the making time of the object file is between Jan. 1, 2008 and May 1, 2008. To further judge the concrete making time, it needs to study variation characteristics with time of the V value of the ink used in the object file.

It should be noted that, the result of $V_j - V_y$ represents the difference between the object file and the sample file only. In actual analysis process, the difference between $V_j$ and $V_y$ could not lead to the conclusion. Because the variation of $V_j - V_y$ is not caused by itself sometimes it is effected by the error.

So it must set a designated index data A which is a data synthetically calculated with the error above-mentioned referring to the ink category. The designated index data A may be a fixed value or different value in accordance with the different ink category. Only the ratio of the absolute value of $V_j - V_y$ to $V_j$ multiplying number 100 is greater than the designated index data A, it is considered that $V_j$ is different from $V_y$. At this time it must further compare $V_j$ and $V_y$. If $V_j > V_y$, then determine $V_j$ was made earlier than $V_y$, On the contrary, $V_j$ was made later than $V_y$. If the ratio of the absolute value of $V_j - V_y$ to $V_j$ multiplying number 100 is smaller than the designated index data A, it is considered that $V_j$ and $V_y$ are the same.

The present invention also uses color-brightness analysis method other than the said color-space analysis method:

For color, brightness is an important index. It represents one color which has a gradual change from light to dark on subjective visually. The color-brightness analysis method includes converting the RGB data got by the said color-space analysis method for getting brightness value of the color data; and then calculating the index of the maximum, minimum, average of the RGB data; finally obtaining a group of results evaluating the brightness value.

Figure 7:
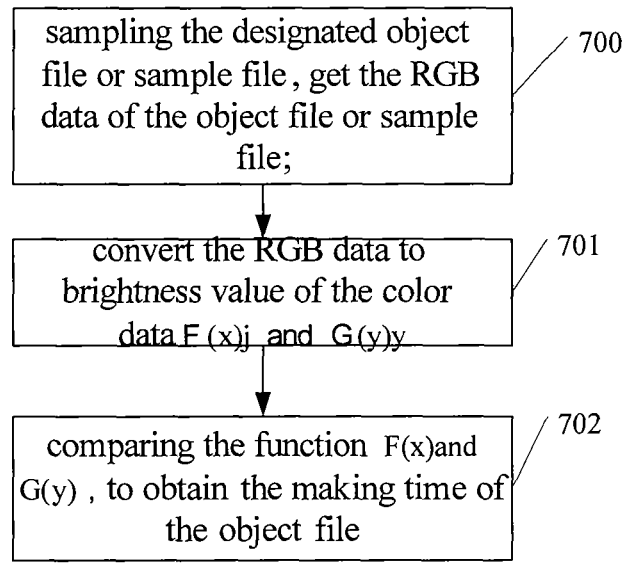
FIG. 7 is a flow chart illustrating anther embodiment of the method for verifying making time of a file by computer in accordance with the present invention.

Referring to FIG. 7, the detailed operation steps are as follows:

At step 700, sampling the designated object file or sample file, get the RGB data of the object file or sample file;

Repeat the step 700, get multiple group data of the object file or sample file as follows:

$V_j, MAXV_j, MINV_j, STDV_j$;
$V_y, MAXV_y, MINV_y, STDV_y$;

At step 701, convert the RGB data to brightness value of the color data $F(x)_j$ and $G(y)_y$; Wherein:

$F(x)_j, x=\{V_j, MAXV_j, MINV_j, STDV_j\}$
$G(y)_y, y=\{V_y, MAXV_y, MINV_y, STDV_y\}$

At step 702, comparing the function: $F(x)_j$ and $G(y)_y$ to obtain the making time of the object file, specific by the following equation that:

If $$\frac{|F(x)_j - G(y)_y|}{F(x)_j} \times 100 > A,$$

then determining the making time of the object file is different from the sample file; and while $F(x)_j - G(y)_y > 0$, then determining the making time of the object file is earlier than the making time of the sample file; while $F(x)_j - G(y)_y < 0$, then determining the making time of the object file is later than the making time of the sample file;

If $$\frac{|F(x)_j - G(y)_y|}{F(x)_j} \times 100 \leq A,$$

determining said object file having the same making time as said sample file;

Otherwise, the HSL space analysis method would be used to analysis the color data, HSL is a space signify method often used in color-space. HSL color pattern is a color standard in the industry, stacking the change of the Hue, Saturation, Lum channel can get the promiscuous color, HSL represent the color of the Hue, Saturation, Lum channel, and it including all colors the human eyes can percept, is the most broad color system. H represents Hue, S represents Saturation, L represents Saturation. After RGB data are converted to HSL data, make statistic analysis on the difference between the components to get the analysis result data. The detailed description is thus omitted here.

And the Lab Space analysis method can be used to analysis color data, L represents Lum, a and b represent opposition dimension color. RGB data converts to Lab data; statistic analysis the Lab data will get the result. The detailed description is thus omitted here.

Figure 8:
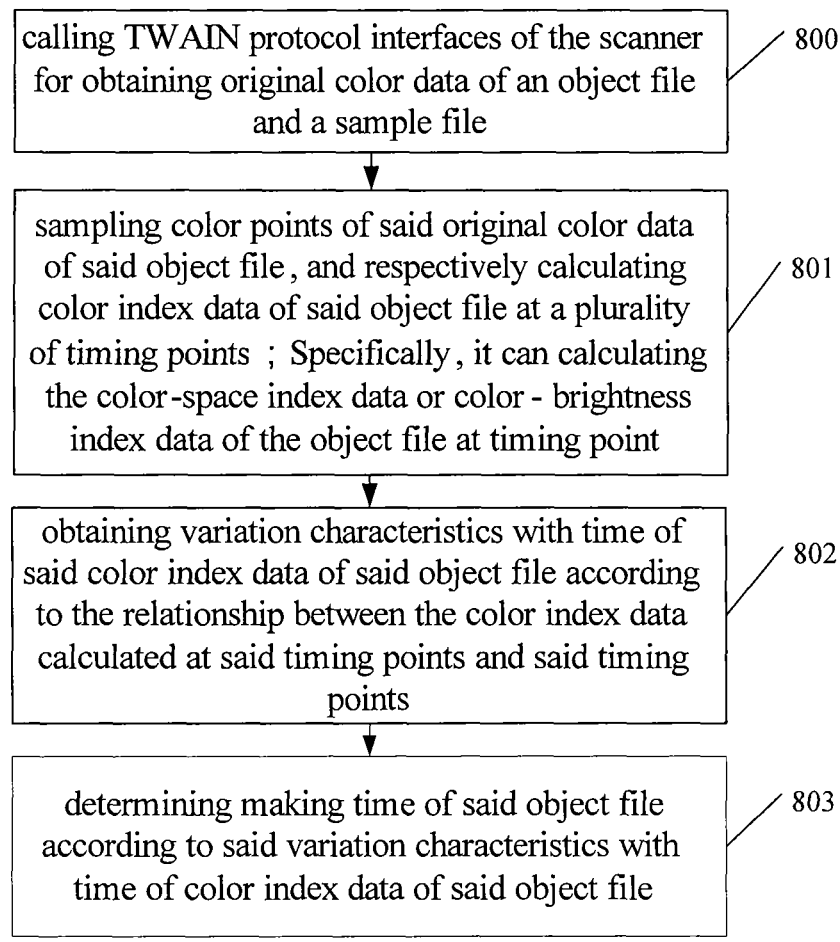
FIG. 8 is a flow chart illustrating anther embodiment of the method for verifying making time of a file by computer in accordance with the present invention.

The embodiment has described the method for verifying making time of the file in a situation that making time of the sample file is known. In some cases, the applicant could not offer such sample file having known making time, the present invention also provides anther method for verifying making time of the file without the sample file. Referring to FIG. 8, the method includes:

At step 800, calling TWAIN protocol interfaces of the scanner for obtaining original color data of an object file and a sample file;

At step 801, sampling color points of said original color data of said object file, and respectively calculating color index data of said object file at a plurality of timing points; specifically, it can calculate the color-space index data or color-brightness index data of the object file at timing point; the detailed calculating process is disclosed as the example above, the detailed description is thus omitted here.

At step 802, obtaining variation characteristics with time of said color index data of said object file according to the relationship between the color index data calculated at said timing points and said timing points;

At step 803, determining making time of said object file according to said variation characteristics with time of color index data of said object file.

Figure 9:
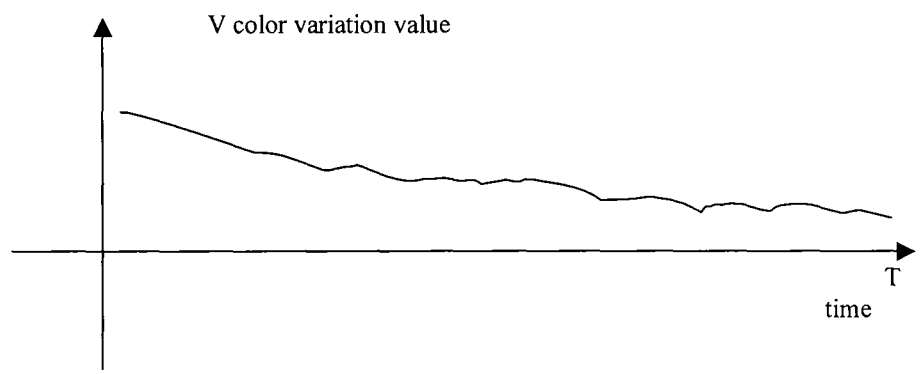
FIG. 9 is a curve graph illustrating the color changes with time in accordance with the present invention.

Specifically, referring to FIG. 9, it is a curve graph illustrating the color changes with the time in accordance with the present invention; As the FIG. 9, the different color has change process with the time, and the color index data will become larger with the time. In the fact environment, the color index data will change nonlinearity at phased. But the trend is change with the time generally, when it reaches a given period of time, this trend will be at relatively stable condition.

Although the color index data value of different color is different, after a large of experiments it finds that there is some characteristics in the color variation, for example the black ink, carbon ink, the neutral pen ink. For some ink of which variation characteristics are known, its absolute making time could be back-calculated.

Figure 10:
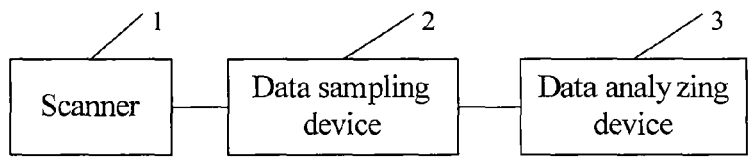
FIG. 10 is a schematic view illustrating a structure of a computer system for verifying making time of a file in accordance with the present invention.

Referring to FIG. 10, it is a structure graph illustrating a computer system for verifying making time of a file in accordance with the present invention;

The computer system comprises:

a scanner 1 for obtaining original color data of a object file and a sample file by calling TWAIN protocol interfaces thereof, wherein making time of said sample file is known;

a data sampling device 2 for sampling color points of said original color data of said object file thereby calculating color index data of said object file; and sampling color points of said original color data of said sample file thereby calculating color index data of said sample file;

the implement of the said data sampling device 2 may use n×n pattern to sampling the color sample of the original color data of the object file and the sample file, wherein the n is positive integer. The implementation as the methods above, the detailed description is thus omitted here.

a data analyzing device 3 for comparing said color index data of said object file with said color index data of said sample file, and determining making time of said object file based on said known making time of said sample file.

The said data sampling device 2 takes the color-space or color-brightness as index, then calculating the color index data of the said object file.

It should be noted that using computer to implement the data sampling device 2 and the data analysis device 3, and the scanner 1 can be implement separately of the computer.

Figure 11:
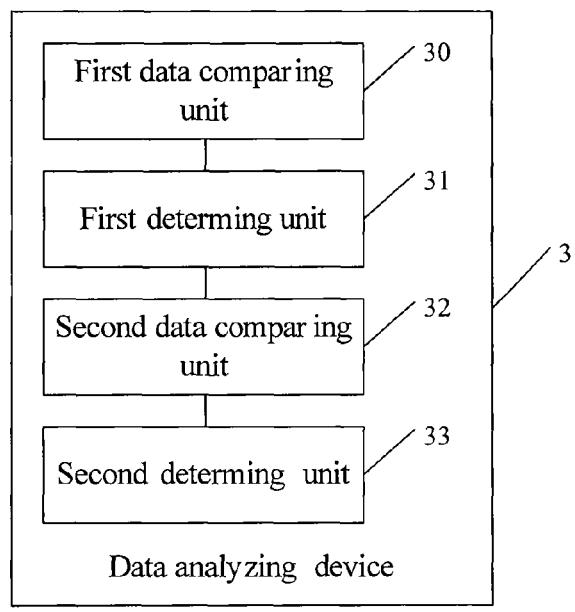
FIG. 11 is a schematic view illustrating a structure of a data analysis device in the computer system for verifying making time of a file in accordance with the present invention.

Referring to FIG. 11, the data analyzing device 3 device 3 includes:

a first data comparing unit 30 for comparing $$\frac{|C_j - C_y|}{C_j} \times 100$$

with A, wherein, $C_j$ is the color index data of the object file, $C_y$ is the color index data of the sample file, A is the designated index data;

a first determining unit 31 for determining said object file having the same making time as said sample file when said first data compare unit figuring out $$\frac{|C_j - C_y|}{C_j} \times 100 \leq A,$$

or else determining said object file having different making time for said sample file;

a second data comparing unit 32 for comparing $C_j$ with $C_y$ when said first determining unit determining said object file having different making time for said sample file;

a second determining unit 33 for determining said object file having earlier making time than said sample file when said second data comparing unit figuring out $C_j - C_y > 0$; and determining said object file having later making time than said sample file when said second data comparing unit figuring out $C_j - C_y < 0$;

The method of data analyzing device 3 analyses the color as mention above, the detailed description is thus omitted here.

Figure 12:
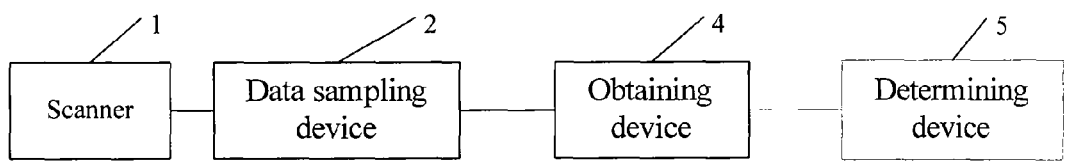
FIG. 12 is a schematic view illustrating anther structure of the computer system for verifying making time of a file in accordance with the present invention.

Referring to FIG. 12, it is anther structure graph illustrating a computer system for verifying making time of a file in accordance with the invention, comprising:

a scanner 1 for calling TWAIN protocol interfaces of the scanner for obtaining original color data of an object file and a sample file;

a data sampling device 2 for sampling color points of said original color data of said object file, and respectively calculating color index data of said object file at a plurality of timing points;

an obtaining device 4 for obtaining variation characteristics with time of said color index data of said object file according to the relationship between the color index data calculated at said timing points and said timing points;

a determining device 5 for determining making time of said object file according to said variation characteristics with time of color index data of said object file.

The processes for verifying making time of a file by the computer system disclosed in this embodiment are identical to the method shown in FIG. 8, the detailed description is thus omitted here.

In accordance with the present invention, firstly, on the premise of the ink used in the sample file being the same as the object file, using the computer as a data analysis platform with aid of the software equipped and programmed therein could achieve the analysis of making time of the file. This solution is rarely influenced by man-made factors for involving a lot of computer operation so that the analysis result is objective and true. Besides, the operation is simple and easy.

Secondly, it makes analysis directly to the color of the object file or the sample file without damaging such file. The object file or the sample file could be verified and analyzed repeatedly so as to provide security for the result.

Thirdly, the present invention could be utilized in a wide range. Among the conventional chemical methods, only a few types of ink could be analyzed. It is not enough since the object file or the sample file is increasingly complicated. The present invention can analysis many types of ink used in the object file or sample file, such as neutral pen ink of the ball-point pen, the black ink of the fountain pen, carbon ink, print words and copy words, seal and so on. The present invention is practiced by computer without focusing on the ingredients of the ink any more and has high utility value accordingly.

Fourthly, the present invention can get the accurate making time of the object file. Here the making time of the object file is relative to the making time of the sample file. By scanning the object file repeatedly and analyzing data by the computer, variation characteristics with time of ink used in the object file could be calculated and then the absolute making time of the object file could also be back-calculated. It should be noted that the absolute making time of the object file is relative to the relative making time of the object file; the method for verifying the absolute making time of a file without comparing with the making time of the sample file.

The present invention may be realized in hardware, software or a combination of hardware and software. Any kinds of computer system or other apparatus adapted for carrying out the methods described herein is suited. A typical combination of hardware and software may be a general-purpose computer system with a computer program that, when being loaded and executed, controls the computer system such that it carries out the methods described herein. The present invention may also be embedded in a computer program product, which comprises all the features enabling the implementation of the methods described herein, and which when loaded in a computer system is able to carry out these methods. The computer program product may be stored in certain storage medium such as ROM/RAM, magnetic disk or optical disc. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A method for verifying making time of a file by computer, comprising:

calling TWAIN protocol interfaces of a scanner for obtaining original color data both of an object file and a sample file, wherein making time of said sample file is known;

sampling color points of said original color data of said object file thereby calculating color index data of said object file; and sampling color points of said original color data of said sample file thereby calculating color index data of said sample file; and comparing said color index data of said object file with said color index data of said sample file, and determining making time of said object file based on said known making time of said sample file;

wherein comparing said color index data of said object file with said color index data of said sample file, and determining making time of said object file based on said known making time of said sample file, comprises:

if $$\frac{|C_j - C_y|}{C_j} \times 100 \le A,$$

determining said object file having the same making time as said sample file; or else determining said object file having a different making time from said sample file; wherein said character $C_j$ is representative of the color index data of said object file, said character $C_y$ is representative of the color index data of said sample file, said character A is representative of the designated index data;

in the situation that making time of said object file is different form that of said sample file, if $C_j-C_y>0$, then determining said object file having earlier making time than said sample file; if $C_j-C_y<0$, then determining said object file having later making time than said sample file.

2. The method as claimed in claim 1, wherein the step of sampling color points of said original color data of said object file and said sample file, comprises:

using n×n pattern for sampling color points of said original color data of said object file and the sample file many times, wherein said character n is positive integer.

3. The method as claimed in claim 2, wherein the step of calculating color index data of said object file and said sample file, comprises:

through taking the color space or color brightness as an index, calculating color index data of said object file and said sample file.

4. A computer system for verifying making time of a file, comprising:

a scanner for obtaining original color data of a object file and a sample file by calling TWAIN protocol interfaces thereof, wherein making time of said sample file is known;

a data sampling device for sampling color points of said original color data of said object file thereby calculating color index data of said object file; and sampling color points of said original color data of said sample file thereby calculating color index data of said sample file; and a data analyzing device for comparing said color index data of said object file with said color index data of said sample file, and determining making time of said object file based on said known making time of said sample file;

wherein said data analyzing device comprises:
a first data comparing unit for comparing $$\frac{|C_j - C_y|}{C_j} \times 100$$

with A, wherein, $C_j$ is the color index data of the object file, $C_y$ is the color index data of the sample file, A is the designated index data;
    a first determining unit for determining said object file having the same making time as said sample file when said first data compare unit figuring out $$\frac{|C_j - C_y|}{C_j} \times 100 \leq A,$$

or else determining said object file having different making time for said sample file;

a second data comparing unit for comparing $C_j$ with $C_y$ when said first determining unit determining said object file having different making time for said sample file; and
    a second determining unit for determining said object file having earlier making time than said sample file when said second data comparing unit figuring out $C_j - C_y > 0$; and determining said object file having later making time than said sample file when said second data comparing unit figuring out $C_j - C_y < 0$.

5. The computer system as claimed in claim 4, wherein said data sampling device is configured for adopting n×n pattern to sample said color points in said original color data of said object file and said sample file, wherein said character n is positive integer.

6. The computer system as claimed in claim 4, wherein said data sampling device is configured for calculating said color index data of said object file and said sample file through taking color space or color brightness as an index.

* * * * *